United States Patent
Terada

(10) Patent No.: US 11,007,596 B2
(45) Date of Patent: May 18, 2021

(54) PROGRAM CREATION DEVICE, WELDING SYSTEM, AND PROGRAM CREATION METHOD

(71) Applicant: AMADA HOLDINGS CO., LTD., Kanagawa (JP)

(72) Inventor: Kosei Terada, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/651,091

(22) PCT Filed: Oct. 2, 2018

(86) PCT No.: PCT/JP2018/036903
§ 371 (c)(1),
(2) Date: Mar. 26, 2020

(87) PCT Pub. No.: WO2019/069934
PCT Pub. Date: Apr. 11, 2019

(65) Prior Publication Data
US 2020/0230730 A1      Jul. 23, 2020

(30) Foreign Application Priority Data
Oct. 2, 2017   (JP) .............................. JP2017-192519

(51) Int. Cl.
*B23K 9/095*  (2006.01)
*B23K 9/04*   (2006.01)
(Continued)

(52) U.S. Cl.
CPC ............ *B23K 9/0953* (2013.01); *B23K 9/044* (2013.01); *B23K 9/0956* (2013.01);
(Continued)

(58) Field of Classification Search
CPC .......... B23K 9/04; B23K 9/044; B23K 9/046; B23K 9/095; B23K 9/0953; B23K 9/0956;
(Continued)

(56) References Cited

U.S. PATENT DOCUMENTS 9,293,056 B2 *  3/2016  Zboray .................. B23K 9/095
9,483,959 B2 * 11/2016  Wallace .................. G09B 9/00
(Continued)

FOREIGN PATENT DOCUMENTS

EP      143580 A2    7/2004
JP      6-31450 A    2/1994
(Continued)

OTHER PUBLICATIONS

Machine translation for 06031450 (Year: 1994).*
(Continued)

*Primary Examiner* — Robert J Utama
*Assistant Examiner* — Ayub A Maye
(74) *Attorney, Agent, or Firm* — Greenblum & Bernstein, P.L.C.

(57) ABSTRACT

A welding program is created for performing spot welding by a program creation device. The program creation device includes a display unit configured to display an image, and an image generation unit configured to generate image data of a product model before being subjected to spot welding in accordance with shape data on a product and display the product model on the display unit, a display control unit configured to make a workpiece having a selected surface in the product model to be semitransparent, a welding portion setting unit configured to set welding portions to be allotted for the selected surface in the product model, and a program
(Continued)

creation unit configured to create the welding program including related data for a welding robot with regard to the set welding portions.

8 Claims, 10 Drawing Sheets

(51) Int. Cl.
  *B23K 9/127* (2006.01)
  *G05B 19/401* (2006.01)
  *G06T 7/00* (2017.01)
(52) U.S. Cl.
  CPC .......... *B23K 9/1274* (2013.01); *G05B 19/401* (2013.01); *G06T 7/0004* (2013.01)
(58) Field of Classification Search
  CPC .......... B23K 9/12; B23K 9/127; G05B 19/18; G05B 19/182; G05B 19/401
  See application file for complete search history.

(56) References Cited

U.S. PATENT DOCUMENTS

| | | | |
|---|---|---|---|
| 9,836,987 B2 * | 12/2017 | Postlethwaite | G09B 9/00 |
| 2010/0302242 A1 | 12/2010 | Buchanan et al. | |
| 2011/0120978 A1 * | 5/2011 | Takahashi | B23K 11/258 |
| | | | 219/86.25 |
| 2015/0265381 A1 | 9/2015 | Fisker et al. | |
| 2016/0207142 A1 * | 7/2016 | Kawamoto | B23K 26/0626 |
| 2017/0050267 A1 | 2/2017 | Kung et al. | |
| 2018/0333807 A1 * | 11/2018 | Hasegawa | B23K 26/342 |
| 2019/0030582 A1 * | 1/2019 | Olsson | B23K 15/0046 |

FOREIGN PATENT DOCUMENTS

| | | | |
|---|---|---|---|
| JP | 8-286722 A | 11/1996 |
| JP | 10-283010 A | 10/1998 |
| JP | 2002-59271 A | 2/2002 |
| JP | 2005-349398 A | 12/2005 |
| JP | 2006-228013 A | 8/2006 |
| JP | 2010-140225 A | 6/2010 |
| JP | 2011-45898 A | 3/2011 |
| JP | 2012-24867 A | 2/2012 |
| JP | 2015-13298 A | 1/2015 |
| JP | 2016-76052 A | 5/2016 |
| WO | 2015/129249 A1 | 9/2015 |

OTHER PUBLICATIONS

Machine translation for 2002059271 (Year: 2002).*
Dec. 18, 2018 International Search Report issued in International Patent Application No. PCT/JP2018/036903,.
Mar. 5, 2019 Decision to Grant (Office Action) in Japanese Patent Appl. No. 2017-192519 and English translation thereof.
Dec. 19, 2018 Notice of Reasons for Refusal (Office Action) issued in Japanese Patent Appl. No. 2017-192519, and English translation thereof.
Nov. 30, 2020 European Office Action in European Patent Application No. 18865215.0.

* cited by examiner

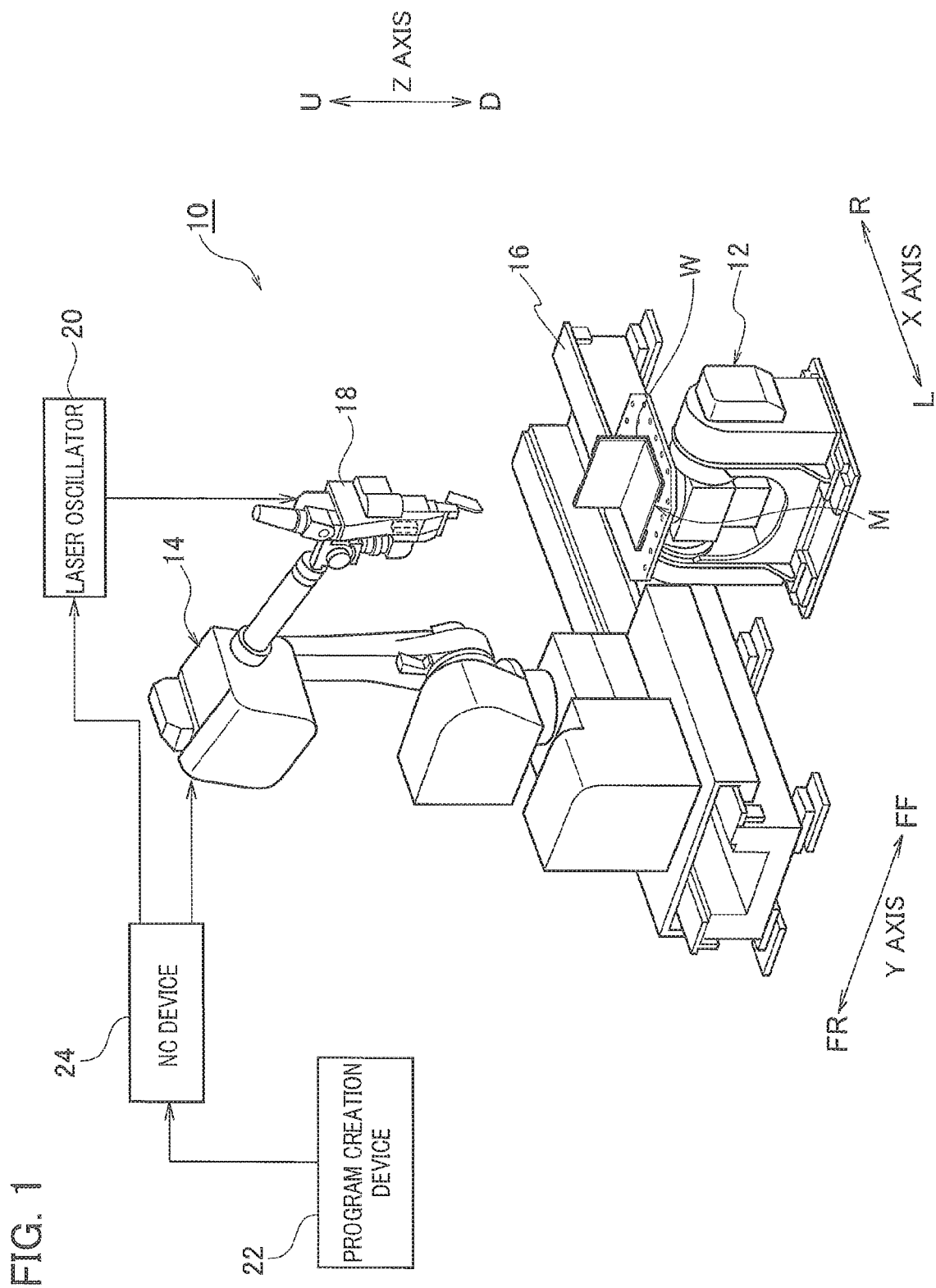

PROGRAM CREATION DEVICE, WELDING SYSTEM, AND PROGRAM CREATION METHOD

TECHNICAL FIELD

The present invention relates to a program creation device and the like for creating a welding program for controlling a welding robot so as to perform spot welding on a plurality of sheet-like workpieces (metal sheets).

BACKGROUND ART

A welding program is preliminarily created for controlling a welding robot to perform linear welding or spot welding on a plurality of workpieces so as to manufacture products through the linear welding or the spot welding.

For example, image data of a product model is generated according to figure data of a product, and the image data is then displayed on a display unit such as a display (on screen) in a program creation device. Subsequently, welding portions to be allotted for the product model are set. A welding program is then created including operation-related data for a welding robot with regard to the set welding portions. The created welding program is sent to a NC device for controlling the welding robot.

Patent Literature 1 to Patent Literature 3 are prior art documents related to the present invention.

CITATION LIST

Patent Literature

Patent Literature 1: Japanese Unexamined Patent Application Publication No. 2015-13298
Patent Literature 2: Japanese Unexamined Patent Application Publication No. 2016-76052
Patent Literature 3: Japanese Unexamined Patent Application Publication No. 2011-45898

SUMMARY OF INVENTION

When a welding program for linear welding is created, the back side of welding portions in a product model does not need to be checked upon the setting of the welding portions. The back side of welding portions in a product model sometimes cannot be visually checked in a normal state when a welding program for spot welding is created, since a plurality of workpieces are stacked on one another at the welding portions. In the latter case, the welding portions should be set appropriately while the product model is rotated so as to check the presence or absence of holes or notches on the back side of the welding portions. This may impede sufficient enhancement in efficiency of the operation of creating the welding program.

An object of the present invention is to provide a program creation device and the like having an inventive configuration capable of solving the above conventional problem.

A first aspect of the present invention provides a program creation device for creating a welding program used for a welding system to control a welding robot for performing spot welding on a plurality of stacked sheet-like workpieces (metal sheets) so as to manufacture a product, the device including a display unit configured to display an image (on screen), an image generation unit configured to generate image data of a product model (a model designed according to an actual three-dimensional shape of the product) and display the product model (an image of the product model) on the display unit, a display control unit configured to make a workpiece having a selected surface in the product model to be semitransparent, a welding portion setting unit configured to set a welding portion (a welding portion of the workpieces) to be allotted for the product model (the selected surface) while the workpiece having the selected surface is made to be semitransparent, and a program creation unit configured to create the welding program including related data for the welding robot with regard to the set welding portion.

According to the first aspect of the present invention, the image generation unit generates the image data of the product model, and displays the product model on the display unit. The display control unit then makes the workpiece having the selected surface in the product model to be semitransparent. The welding portion setting unit sets the welding portion to be allotted for the selected surface (the selected surface in the product model) while the workpiece having the selected surface is made to be semitransparent. The program creation unit creates the welding program including the related data for the welding robot with regard to the set welding portion.

As described above, the welding portion is set and allotted for the selected surface while the workpiece having the selected surface is made to be semitransparent. The program creation device thus can appropriately set the welding portion without rotating (reversing) the product model while avoiding holes or notches. Namely, the welding portion can be set appropriately without the confirmation of the presence or absence of the holes or the notches on the back side of the welding portion.

A second aspect of the present invention provides a welding system for performing spot welding on a plurality of stacked sheet-like workpieces (metal sheets) so as to manufacture a product, the system including a welding robot configured to perform the spot welding on the plural workpieces, the program creation device according to the first aspect of the present invention for creating the welding program for performing the spot welding on the plural workpieces, and a NC device configured to control the welding robot in accordance with the welding program.

The second aspect of the present invention can achieve the operations similar to the first aspect of the present invention.

A third aspect of the present invention provides a program creation method of creating a welding program to control a welding robot for performing spot welding on a plurality of stacked sheet-like workpieces (metal sheets) so as to manufacture a product, the method including generating image data of a product model (a model designed according to an actual shape of the product) and displaying the product model (an image of the product model) on a display unit (on screen), making a workpiece having a selected surface to be semitransparent, setting a welding portion (a welding portion of the workpieces) to be allotted for the selected surface (the selected surface in the product model), and creating the welding program including related data for the welding robot with regard to the set welding portion.

According to the third aspect of the present invention, as described above, the welding portion is set and allotted for the selected surface while the workpiece having the selected surface is made to be semitransparent. The program creation method thus can appropriately set the welding portion without rotating (reversing) the product model while avoiding holes or notches. Namely, the welding portion can be set appropriately without the confirmation of the presence or absence of the holes or the notches on the back side of the welding portion.

The present invention can sufficiently enhance the efficiency of the operation of creating the welding program for the spot welding.

BRIEF DESCRIPTION OF DRAWINGS

FIG. 1 is a schematic perspective view of a welding system according to an embodiment of the present invention.

DESCRIPTION OF EMBODIMENTS

Figure 2A:
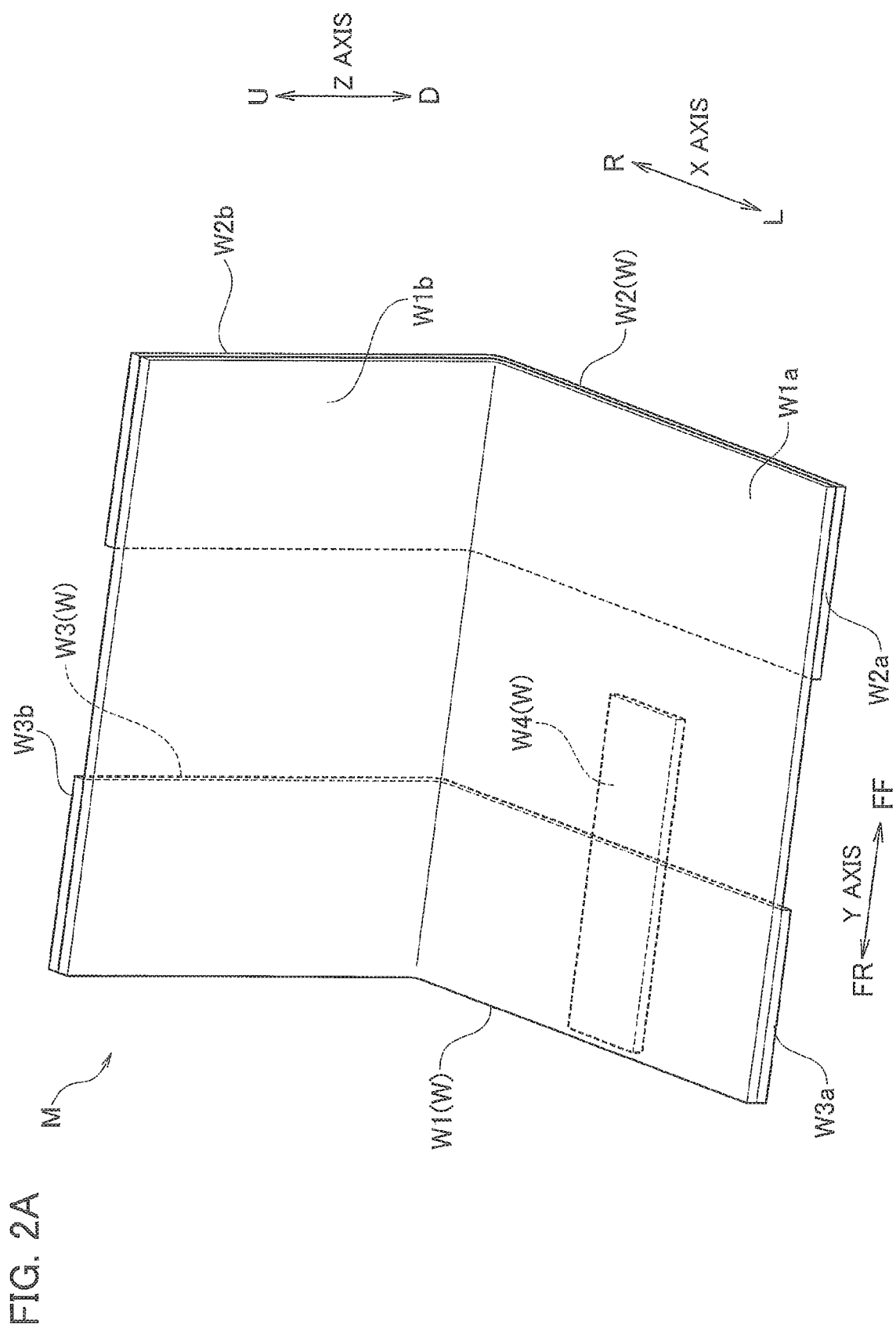
FIG. 2A is a perspective view of a product as a target to be manufactured by the welding system according to the embodiment of the present invention.

An outline of a welding system according to an embodiment of the present invention, a product as a target to be manufactured by the welding system according to the embodiment of the present invention, and a specific configuration of a program creation device according to the embodiment of the present invention are sequentially described below with reference to the drawings. As used herein, an "X-axis direction" refers to a right-left direction which is one of the horizontal directions, a "Y-axis direction" refers to a front-rear direction which is the other one of the horizontal directions, and a "Z-axis direction" refers to a vertical direction (an upper-lower direction). In the drawings, the indication "FF" refers to a forward direction, the indication "FR" refers to a rearward direction, the indication "L" refers to a leftward direction, the indication "R" refers to a rightward direction, the indication "U" refers to an upward direction, and the indication "D" refers to a downward direction.

Figure 2B:
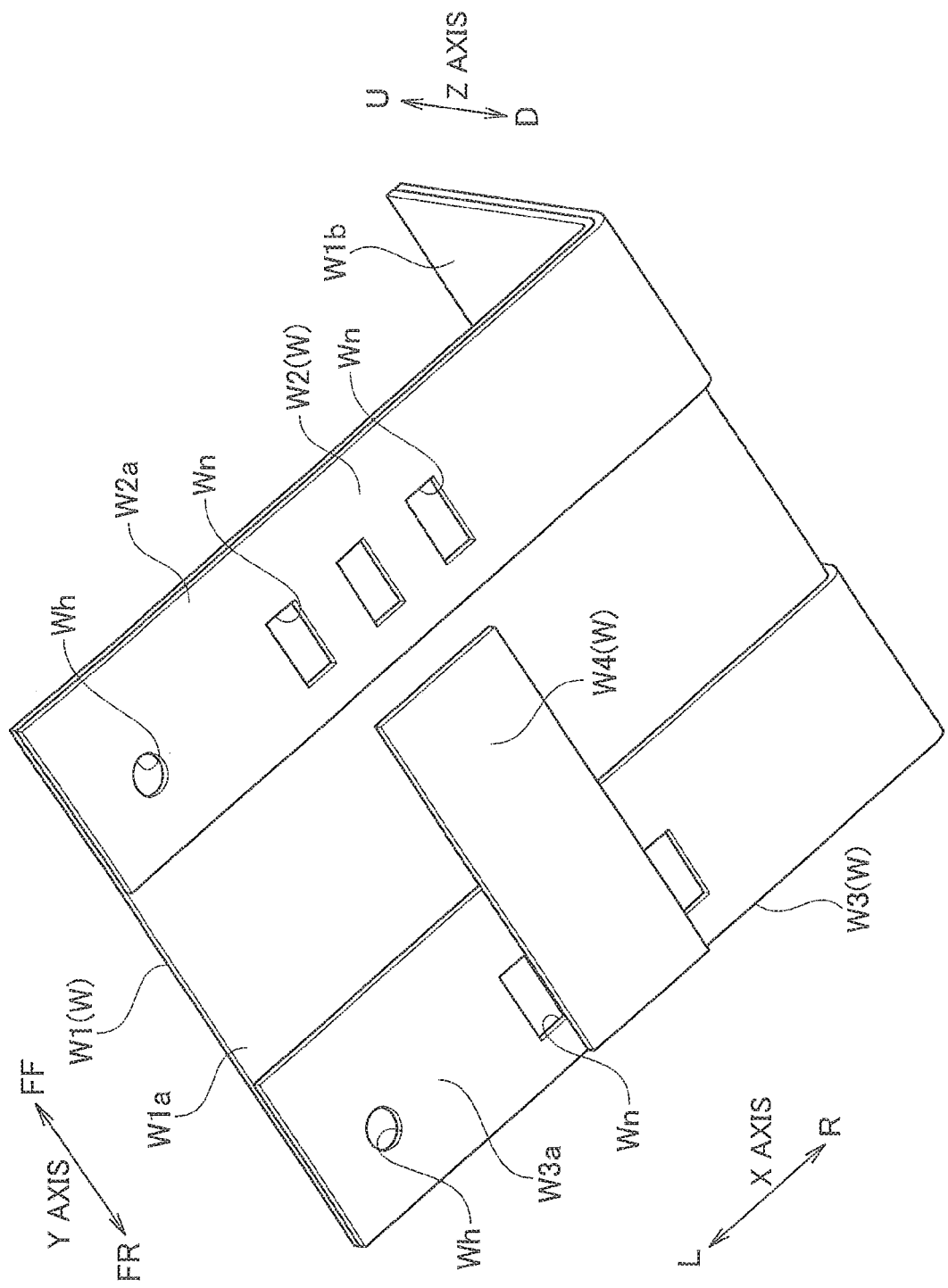
FIG. 2B is a perspective view of the product as a target to be manufactured by the welding system according to the embodiment of the present invention as viewed from the bottom.

As shown in FIG. 1, FIG. 2A, and FIG. 2B, the welding system 10 according to the embodiment of the present invention is a system for performing spot welding on a plurality of stacked sheet-like workpieces (metal sheets) W so as to manufacture a product M. The outline of the welding system 10 according to the embodiment of the present invention is described below.

The welding system 10 includes a mount 12 on which the stacked sheet-like workpieces W are mounted, the mount 12 including jigs (not shown) for attaching the stacked sheet-like workpieces W to appropriate positions. The welding system 10 also includes an articulated welding robot 14 for performing spot welding on the stacked sheet-like workpieces W. The welding robot 14 is supported movably (slidably) in the X-axis direction (the right-left direction) by a pair of guide frames 16 laid behind the mount 12. The welding robot 14 includes a welding head 18 on the tip side for irradiating the workpieces W with laser light (laser beam). The welding head 18 is connected to a laser oscillator 20, such as a fiber laser oscillator or a YAG laser oscillator, for oscillating the laser beam. The other configurations of the welding robot 14 excluding the welding head 18 are the same as those disclosed in JP 2013-184197 or JP 2015-7118, for example, and specific explanations are not made below.

The welding system 10 controls the welding robot 14 and the laser oscillator 20 so as to perform the spot welding on the stacked sheet-like workpieces W. The welding system 10 includes a program creation device 22 for creating a welding program for controlling the welding robot 14 and the like. The program creation device 22 is installed at a position distant from the welding robot 14. The welding system 10 further includes a numerical control (NC) device 24 for controlling the welding robot 14 and the laser oscillator 20 in accordance with the welding program. The NC device 24 is installed adjacent to the welding robot 14 and is connected to the program creation device 22 via a network.

A product M as a target to be manufactured by the welding system 10 according to the embodiment of the present invention is described below.

As shown in FIG. 2A and FIG. 2B, the product M is composed of the plural workpieces W subjected to the spot welding and stacked on one another so as to be integrated together by the spot welding. The product M has an L-shape in the side view, for example. The plural workpieces W include a first workpiece (a first metal sheet) W1, a second workpiece (a second metal sheet) W2 arranged at the front portion on the back side of the first workpiece W1, a third workpiece (a third metal sheet) W3 having an L-shape in the side view and arranged at the rear portion on the back side of the first workpiece W1, and a fourth workpiece (a fourth metal sheet) W4 having a rectangular shape and arranged on the back side of the third workpiece W3. The first workpiece W1, the second workpiece W2, and the third workpiece W3 each have the L-shape in the side view.

The first workpiece W1 has a pair of flat portions W1$a$ and W1$b$. The second workpiece W2 has a flat portion W2$a$ overlapping with the flat portion W1$a$ of the first workpiece W at the front portion, and a flat portion W2$b$ overlapping with the flat portion W1$b$ of the first workpiece W at the front portion (on the right side in the drawings). The third workpiece W3 has a flat portion W3$a$ overlapping with the flat portion W1$a$ of the first workpiece W at the rear portion, and a flat portion W3$b$ overlapping with the flat portion W1$b$ of the first workpiece W at the rear portion (on the left side in the drawings). The fourth workpiece W4 overlaps with the flat portion W3$a$ of the third workpiece W3 without overlapping (without being in contact with) with the flat portion W1$a$ of the first workpiece W1. The second workpiece W2 and the third workpiece W3 are each provided with a hole Wh and a plurality of notches Wn. FIG. 2A and FIG. 2B omit welding marks made on the product M.

The specific configuration of the program creation device 22 according to the embodiment of the present invention is described below.

Figure 3:
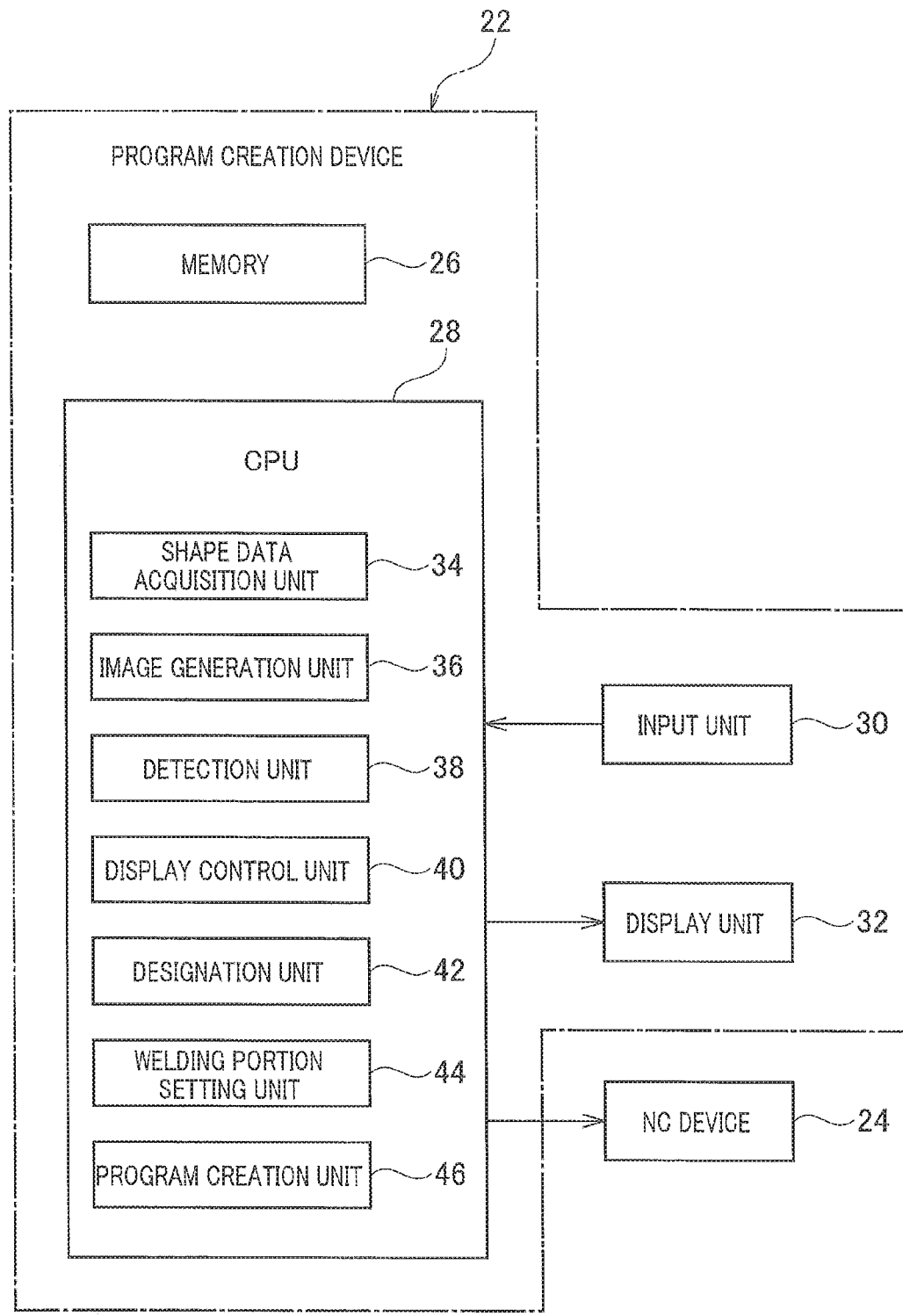
FIG. 3 is a control block diagram of a program creation device according to the embodiment of the present invention.

As shown in FIG. 3, the program creation device 22 is implemented by one or more computers, and has a computer-aided design (CAD) function and a computer-aided manufacturing (CAM) function. The program creation device 22 includes a memory 26 for storing various kinds of programs such as a CAD program and a CAM program and various kinds of data (information), and a central processing unit (CPU) 28 for interpreting and executing the respective programs.

The program creation device 22 includes an input unit 30 through which various information is input, such as workpiece information including the respective dimensions (including the sheet thickness), the shape, and the material of the plural workpieces W (refer to FIG. 2A and FIG. 2B), and product information including the respective dimensions and the shape of the product M (refer to FIG. 2A and FIG. 2B). The input unit 30 includes a keyboard and a mouse, for example. The program creation device 22 further includes a display unit 32 on which images are displayed (on screen). The display unit 32 is a CRT display or a liquid crystal display, for example, and includes a view screen (screen) 32g.

The program creation device 22 serves as each of a shape data acquisition unit 34, an image generation unit 36, a detection unit 38, a display control unit 40, a designation unit 42, a welding portion setting unit 44, and a program creation unit 46. The specific configurations of the shape data acquisition unit 34, the image generation unit 36, the detection unit 38, the display control unit 40, the designation unit 42, the welding portion setting unit 44, and the program creation unit 46 are described below.

Figure 4:
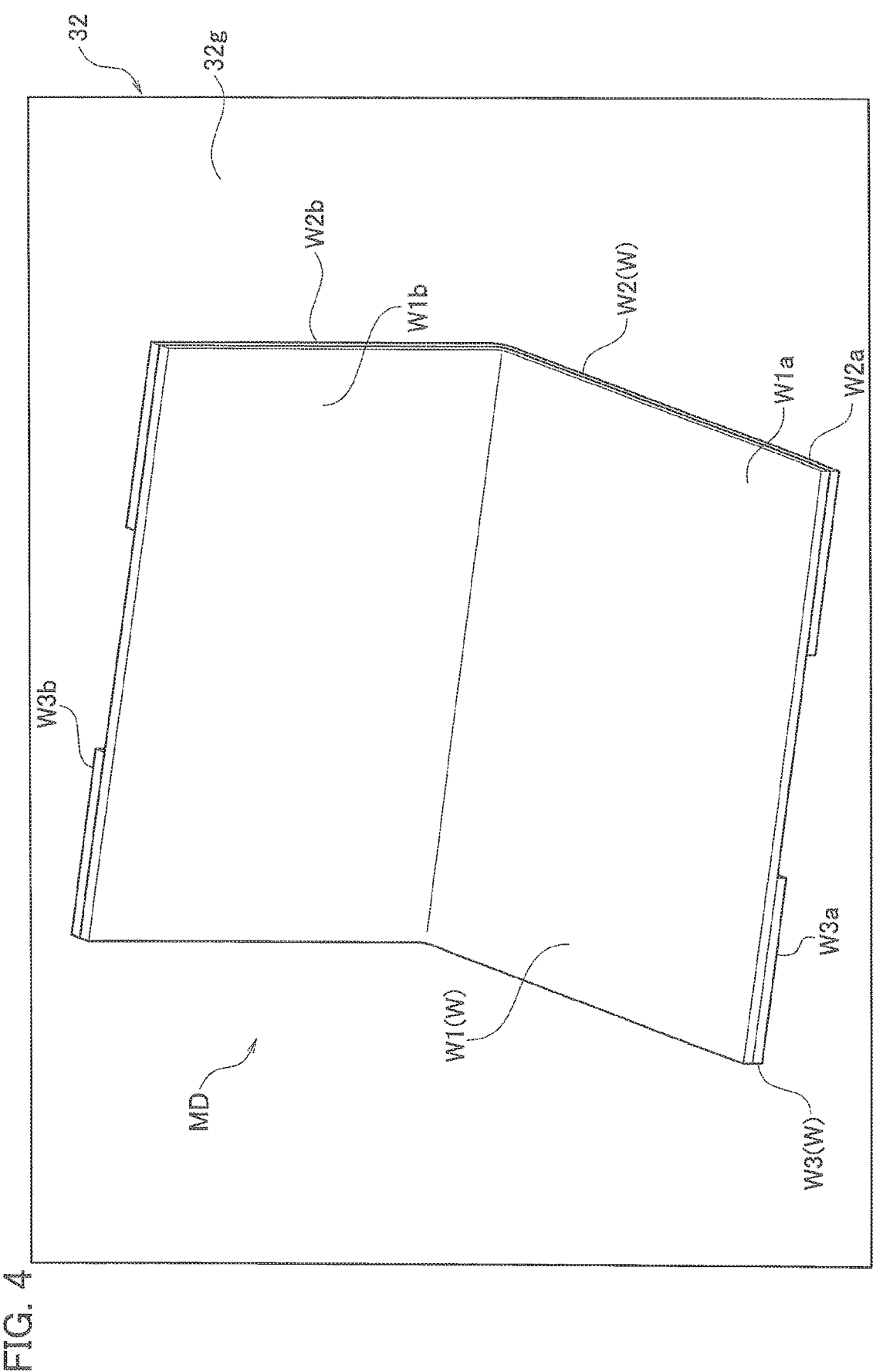
FIG. 4 is a view showing a view screen of a display unit on which a product model is displayed.
Figure 5:
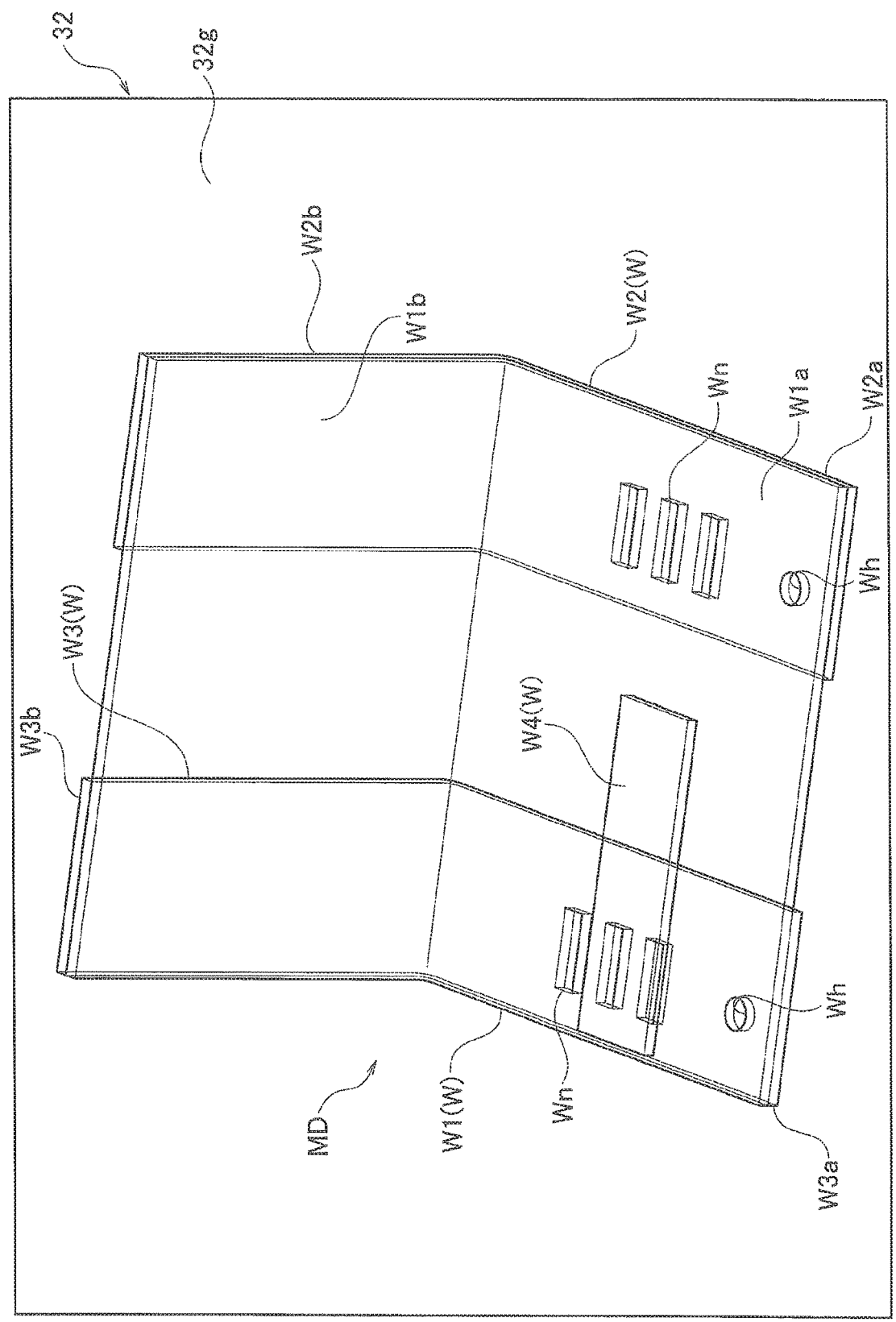
FIG. 5 is a view showing the view screen of the display unit on which a workpiece having a selected surface is displayed in a semitransparent state.
Figure 6:
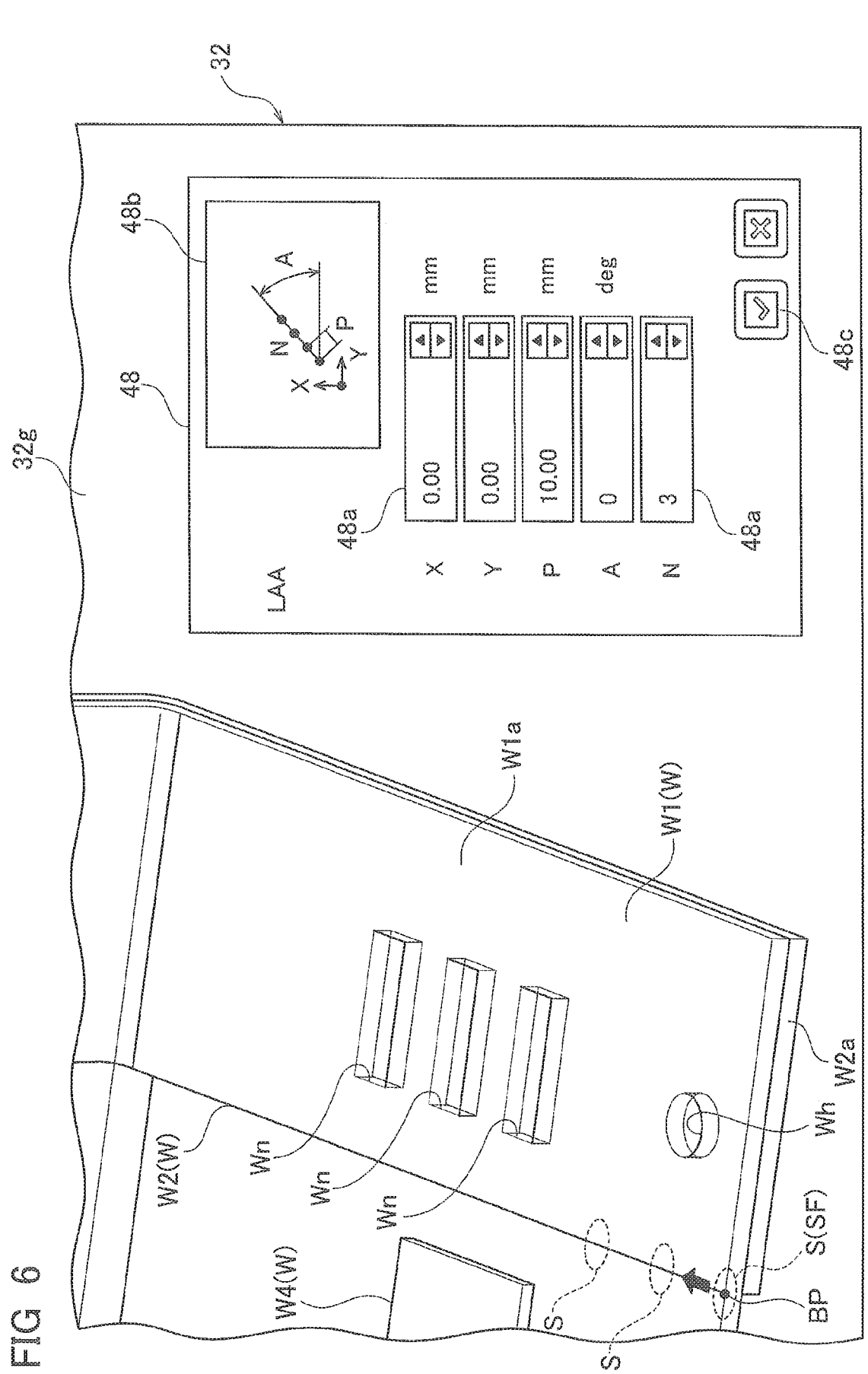
FIG. 6 is an enlarged view of the view screen on which a parameter setting region is displayed together with the product model.
Figure 7:
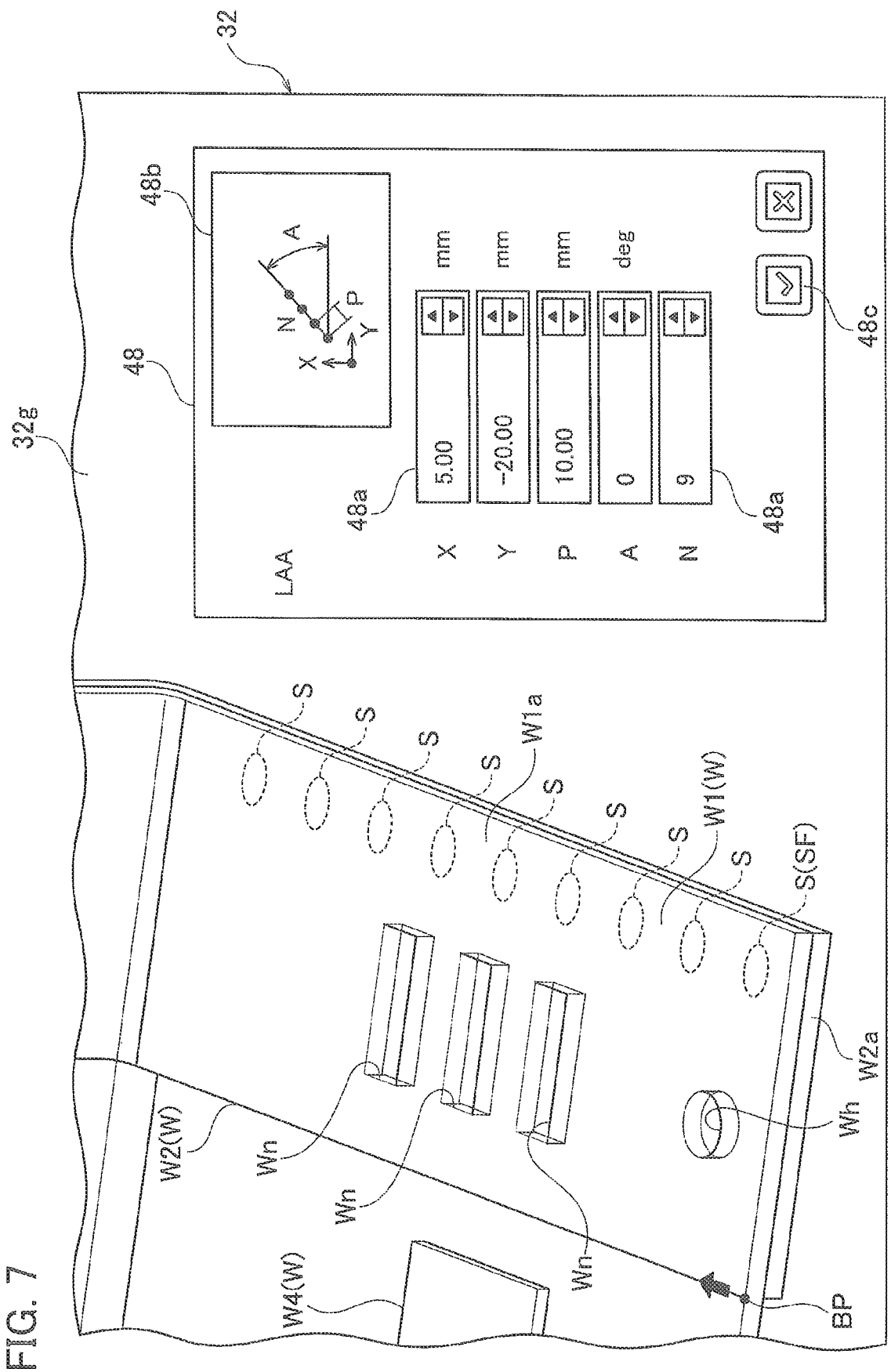
FIG. 7 is an enlarged view of the view screen on which setting values are input to a plurality of setting items in the parameter setting region.

As shown in FIG. 2A, FIG. 3, and FIG. 4, the shape data acquisition unit 34 makes a calculation to acquire three-dimensional shape data on the product M so as to display the actual three-dimensional shape of the product M, in accordance with the input workpiece information and product information. The acquired three-dimensional data on the product M is stored in the memory 26 by the shape data acquisition unit 34. The image generation unit 36 generates (creates) image data of a product model MD (a model designed according to the actual three-dimensional shape of the product M) in accordance with the acquired three-dimensional shape data of the product M. and displays the product model MD (an image of the product model MD) on the view screen 32g of the display unit 32 (FIG. 4).

As shown in FIG. 2A to FIG. 4, when the operator selects a particular surface as a selected surface, the detection unit 38 determines whether there are any overlapping workpieces W on the back side of the workpiece W having the selected surface (on the opposite side of the selected surface), on the condition that the selected surface in the product model MD is not the thickness-side surface (the surface extending in the thickness direction). When the detection unit 38 detects the presence of the overlapping workpieces W, the detection unit 38 recognizes a surface of the corresponding workpiece W, among the overlapping workpieces W, in contact with the workpiece W having the selected surface as a common surface (a contact surface) common to the workpiece W having the selected surface. When a gap between the workpiece W having the selected surface and the corresponding workpiece W on the back side (on the opposite side of the selected surface) is an allowable dimension or greater, the workpiece W on the back side is not determined as the overlapping workpiece W, namely, the workpiece W including the common surface.

More specific explanations are made below. For example, when the surface of the flat portion W1a of the first workpiece W1 is selected as the selected surface by a clicking operation of the operator, the detection unit 38 detects the flat portion W2a of the second workpiece W2 and the flat portion W3a of the third workpiece W3 as the overlapping workpieces W. The detection unit 38 also recognizes the surface of the flat portion W2a of the second workpiece W2 and the surface of the flat portion W3a of the third workpiece W3 as the common surfaces.

As shown in FIG. 2A to FIG. 5, when the presence of the overlapping workpieces W is detected, the display control unit 40 makes the workpiece W having the selected surface in the product model MD to be semitransparent. As used herein, the expression "made to be semitransparent" refers to a transparent state with the outline remaining, having the same meaning as a "skeleton state". The expression "made to be semitransparent" may encompass either a colorless state or a colored state. The display control unit 40 can edit the product model MD (the image of the product model MD), including the processing of rotation, movement, and enlargement.

The operator may select any of the common surfaces (the contact surfaces) as a second selected surface (a specified surface). When the second selected surface (the specified surface) is selected (specified) from the common surfaces (the contact surfaces), the designation unit 42 designates the workpiece W having the second selected surface as a counter workpiece to be welded to the workpiece W having the selected surface. The designation unit 42 also determines whether the second selected surface is parallel to the selected surface when the second selected surface is not selected from any of the common surfaces.

In particular, when the surface of the flat portion W2a of the second workpiece W2 is selected as the second selected surface by the clicking operation of the operator, for example, the designation unit 42 designates the flat portion W2a of the second workpiece W2 as the counter workpiece W to be welded to the flat portion W1a of the workpiece W1 having the selected surface. When the surface of the flat portion W3a of the third workpiece W3 is selected as the second selected surface by the clicking operation of the operator, the designation unit 42 designates the flat portion W3a of the third workpiece W3 as the counter workpiece W to be welded to the flat portion W1a of the workpiece W1 having the selected surface.

When the surface of the fourth workpiece W4 is selected as the second selected surface by the clicking operation of the operator, for example, the designation unit 42 does not designate the fourth workpiece W4 as the counter workpiece W to be welded to the flat portion W1a of the workpiece W1 having the selected surface. The same determination is also applied to the case in which the hole Wh or any of the notches Wn of the flat portion W3a of the third workpiece W3 is selected by the clicking operation of the operator, or the case in which the intermediate portion of the flat portion W1a of the first workpiece W1 (the portion not overlapping with any portion) is selected by the clicking operation of the operator.

When the surface of the flat portion W1b of the workpiece W1 is selected as the second selected surface by the clicking operation of the operator, for example, the designation unit 42 does not designate the workpiece W having the second selected surface as the counter workpiece W to be welded to the flat portion W1a of the workpiece W1 having the selected surface. The designation unit 42 determines that the second selected surface is not parallel to the selected surface.

As shown in FIG. 2A, FIG. 2B, FIG. 3, and FIG. 6, when the workpiece W having the second selected surface (such as W2 or W3) is designated as the counter workpiece to be welded to the workpiece W having the selected surface (such as W1), the display control unit 40 displays a setting region (a parameter setting region or an image of a parameter setting region) 48 on the view screen 32g of the display unit 32 together with the product model MD while the workpiece W having the selected surface is made to be semitransparent. The display control unit 40 further displays, in addition to the setting region 48 on the view screen 32g of the display unit 32, a reference position BP and a plurality of welding portions S superposed on the product model MD. The setting region 48 includes a plurality of setting items 48a for setting the welding portions (the welding portions of the workpieces W) S, an arrangement pattern (an image of an arrangement pattern) 48b of the respective welding portions S, and a finalization button (an image of a finalization button) 48c. The respective setting items 48a include a setting item for setting a position of the first (reference) welding portion SF in the X-axis direction with respect to the reference position BP, a setting item for setting a position of the first (reference) welding portion SF in the Y-axis direction with respect to the reference position BP, an item for setting a pitch between the respective welding portions S, an item for setting an alignment direction of the welding portions S. and an item for setting the number N of the welding portions S. The corresponding initial values (default values) are allotted and displayed to the respective setting items. A setting item for setting a position of the first welding portion SF in the Z-axis direction with respect to the reference position BP may also be included in the setting items 48a. The reference position BP can be changed by the clicking operation of the operator.

As shown in FIG. 2A, FIG. 2B, FIG. 3, and FIG. 7, the welding portion setting unit 44 (FIG. 3) sets the welding portions S to be allotted for the selected surface in the product model MD while the workpiece W having the selected surface is made to be semitransparent, when setting values are input to the respective setting items 48a and the finalization button 48c is pressed by the clicking operation of the operator. In other words, when the workpiece W having the second selected surface (such as W2 or W3) is designated as the counter workpiece W to be welded to the workpiece W having the selected surface (the first selected surface) (such as W1), the welding portion setting unit 44 sets the welding portions S to be allotted for the selected surface in the product model MD while the workpiece W having the selected surface is made to be semitransparent.

Figure 8:
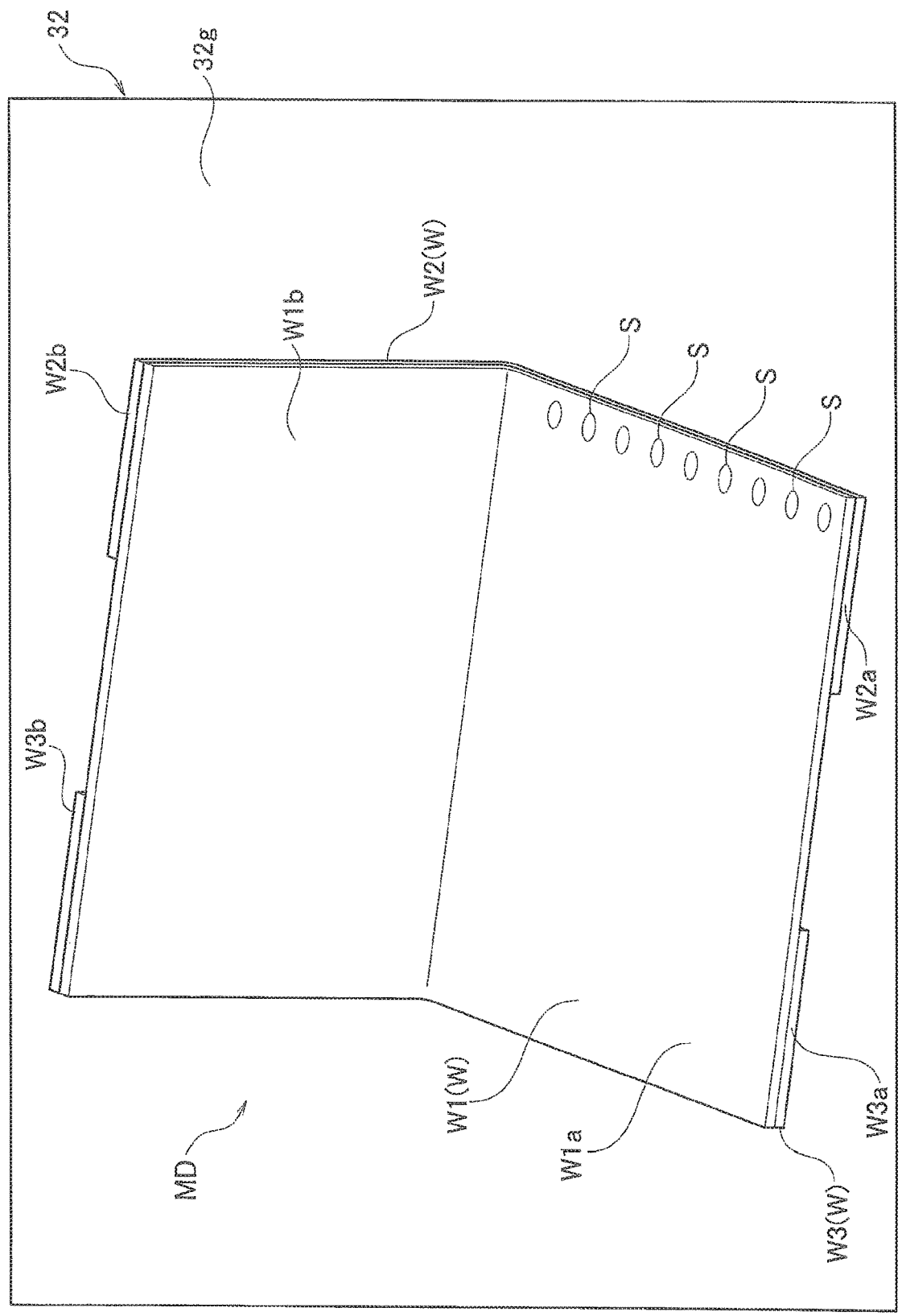
FIG. 8 is a view showing the view screen on which the product model including a plurality of set welding portions is displayed.

As shown in FIG. 3 and FIG. 8, the display control unit 40 returns the workpiece W having the selected surface in the semitransparent state to the initial state (the non-transparent state) while displaying (adding) the set welding portions S to the selected surface in the product model MD.

As shown in FIG. 1 and FIG. 3, the program creation unit 46 creates a welding program including operation-related data for the welding robot 14 with regard to the respective set welding portions S. As used in the embodiment of the present invention, the operation-related data for the welding robot 14 refers to data on a moving course of the welding head 18 relative to the workpieces W. The welding program further includes, in addition to the related data for the welding robot 14, data on the welding conditions such as laser output to the respective welding portions S. The created welding program is stored in the memory 26 by the program creation unit 46 and is further sent to the NC device 24 from the program creation device 22.

The operations and effects according to the embodiment of the present invention, including a program creation method according to the embodiment of the present invention are described below. The program creation method according to the embodiment of the present invention is a method of creating the welding program, including an image generation step, a detection step, a semi-transparentization step, a designation step, a setting region display step, a welding portion setting step, a setting portion finalization step, and a program creation step.

Figure 9:
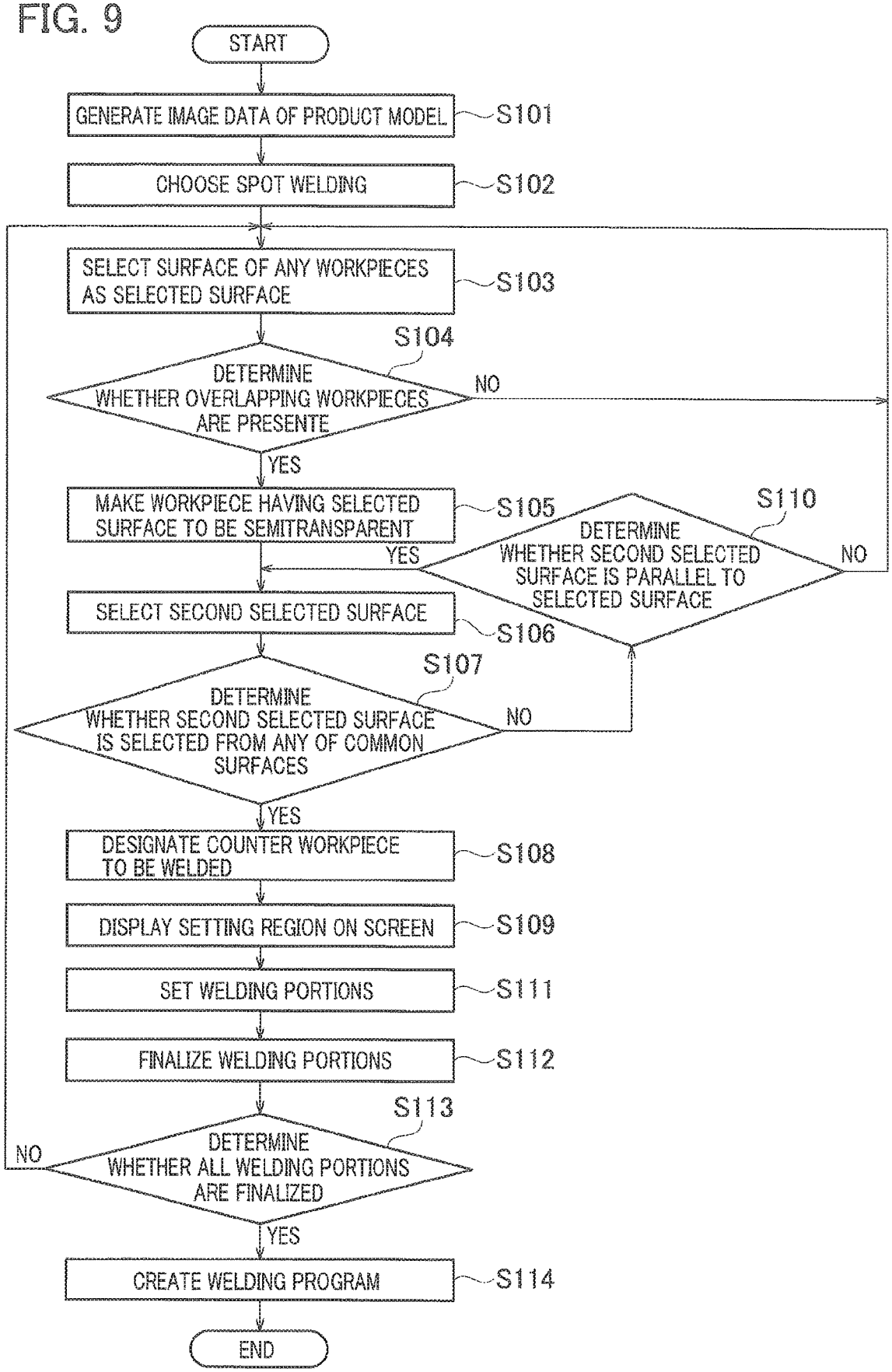
FIG. 9 is a flowchart for explaining the operation of the embodiment of the present invention.

The image generation unit 36 generates the image data of the product model MD according to the three-dimensional shape data of the product M stored in the memory 26, and displays the product model MD on the view screen 32g of the display unit 32 (in step S101 in FIG. 9, the image generation step). The CPU 28 in the program creation device 22 chooses the spot welding as a welding type by the clicking operation of the operator (in step S102 in FIG. 9). The CPU 28 and the like in the program creation device 22 thus can execute the following process from step S103 in FIG. 9. When the linear welding is chosen as the welding type, the CPU 28 and the like in the program creation device 22 executes a different process from step S103 in FIG. 9.

The CPU 28 in the program creation device 22 selects the surface of any of the workpieces W as the selected surface (the first selected surface) by the clicking operation of the operator (in step S103 in FIG. 9). The detection unit 38 then determines whether there are any overlapping workpieces W on the back side of the workpiece W having the selected surface (on the opposite side of the selected surface) in the product model MD (in step S104 in FIG. 9, the detection step). The detection unit 38, when detecting the presence of the overlapping workpieces, recognizes the surfaces in contact with the workpiece having the selected surface as the common surfaces.

When the presence of the overlapping workpieces W is detected (Yes in step S104 in FIG. 9), the display control unit 40 makes the workpiece W having the selected surface to be semitransparent (in step S105 in FIG. 9, the semi-transparentization step). When the presence of the overlapping workpieces W is not detected (No in step S104 in FIG. 9), the CPU 28 in the program creation device 22 returns the process before step S103 in FIG. 9.

The CPU 28 in the program creation device 22 selects (specifies) the second selected surface (the specified surface) on the back side of the workpiece W having the selected surface (on the opposite side of the selected surface) by the clicking operation of the operator after step S105, while the workpiece W having the selected surface is made to be semitransparent (in step S106 in FIG. 9). The designation unit 42 then determines whether the second selected surface is selected from any of the common surfaces while the workpiece W having the selected surface is made to be semitransparent (in step S107 in FIG. 9).

When the second selected surface is selected from any of the common surfaces (Yes in step S107 in FIG. 9), the designation unit 42 designates the workpiece W having the second selected surface as the counter workpiece W to be welded to the workpiece W having the selected surface (in step S108 in FIG. 9, the designation step). The display control unit 40 displays the setting region 48 on the view screen 32g of the display unit 32 together with the product model MD while the workpiece W having the selected surface is made to be semitransparent (in step S109 in FIG. 9, the setting region display step). When the second selected surface is not selected from any of the common surfaces (No in step S107 in FIG. 9), the designation unit 42 determines whether the second selected surface (the portion selected as the second selected surface) is parallel to the selected surface (in step S110 in FIG. 9). When the second selected surface is determined to be parallel to the selected surface (Yes in step S110 in FIG. 9), the CUP 28 in the program creation device 22 returns the process before step S106 in FIG. 9. When the second selected surface is determined not to be parallel to the selected surface (No in step S110 in FIG. 9), the CPU28 in the program creation device 22 returns the process before step S103 in FIG. 9.

The welding portion setting unit 44 sets the welding portions S to be allotted for the product model MD (the selected surface) while the workpiece W having the selected surface is made to be semitransparent (in step S111 in FIG. 9, the welding portion setting step). The display control unit 40 returns the workpiece W having the selected surface in the semitransparent state to the initial state (the non-transparent state) while displaying (adding) the set welding portions S to the product model MD (the selected surface). This can finalize the positions of the welding portions S (in step S112 in FIG. 9, the welding portion finalization step).

When not all of the welding portions are finalized in the product model MD (No in step S113 in FIG. 9), the CPU 28 in the program creation device 22 returns the process before step S103 in FIG. 9. When all of the welding portions are finalized in the product model MD (Yes in step S113 in FIG. 9), the program creation unit 46 creates the welding program including the related data for the welding robot 14 with regard to the respective set welding portions S (in step S114 in FIG. 9, the program creation step).

The process regarding the creation of the welding program by the CPU 28 and the like in the program creation device 22 thus ends.

As described above, the welding portions S are allotted and set for the product model MD (the selected surface) while the workpiece W having the selected surface is made to be semitransparent. This process can appropriately set the welding portions S without rotating (reversing) the product model MD (the image of the product model MD) while avoiding the holes Wh or the notches Wn. Namely, the welding portions S can be set appropriately without the confirmation of the presence or absence of the holes Wh or the notches Wn on the back side of the welding portions S. The embodiment of the present invention can thus sufficiently enhance the efficiency of the operation of creating the welding program by the program creation device 22 for executing the spot welding.

The present invention is not intended to be limited to the embodiment described above, and can be implemented by various configurations as described below. For example, the configuration of the spot welding can be changed from the laser spot welding through the irradiation with the laser beam to resistance spot welding. The process of creating the welding program may further include a step of linear welding. The scope of the present invention is not intended to be limited to the embodiment described above.

REFERENCE SIGNS LIST

10 WELDING SYSTEM
12 MOUNT
14 WELDING ROBOT
16 GUIDE FRAME
18 WELDING HEAD
20 LASER OSCILLATOR
22 PROGRAM CREATION DEVICE
24 NC DEVICE
26 MEMORY
28 CPU
30 INPUT UNIT
32 DISPLAY UNIT
32g VIEW SCREEN (SCREEN)
34 SHAPE DATA ACQUISITION UNIT
36 IMAGE GENERATION UNIT
38 DETECTION UNIT
40 DISPLAY CONTROL UNIT
42 DESIGNATION UNIT
44 WELDING PORTION SETTING UNIT
46 PROGRAM CREATION UNIT
48 SETTING REGION
48a SETTING ITEM
48b ARRANGEMENT PATTERN
48c FINALIZATION BUTTON
BP REFERENCE POSITION
M PRODUCT
MD PRODUCT MODEL
S WELDING PORTION
SF FIRST WELDING PORTION
W WORKPIECE (METAL SHEET)
W1 FIRST WORKPIECE (FIRST METAL SHEET)
W1a FLAT PORTION OF FIRST WORKPIECE
W1b FLAT PORTION OF FIRST WORKPIECE
W2 SECOND WORKPIECE (SECOND METAL SHEET)
W2a FLAT PORTION OF SECOND WORKPIECE
W2b FLAT PORTION OF SECOND WORKPIECE
W3 THIRD WORKPIECE (THIRD METAL SHEET)
W3a FLAT PORTION OF THIRD WORKPIECE
W3b FLAT PORTION OF THIRD WORKPIECE
W4 FOURTH WORKPIECE (FOURTH METAL SHEET)
Wn HOLE
Wn NOTCH

The invention claimed is:

1. A program creation device for creating a welding program used for a welding system to control a welding robot for performing spot welding on a plurality of stacked sheet-like workpieces so as to manufacture a product, the device comprising:
a processor configured to
display an image on a display;
generate image data of a product model and display the product model on the display;
determine whether there are any overlapping workpieces on a back side of a first one of the plurality of stacked sheet-like workpieces having a selected surface in the product model;
make the first one of the plurality of stacked sheet-like workpieces having the selected surface in the product model to be semitransparent;
set a welding portion to be allotted for the selected surface while the first one of the plurality of stacked sheet-like workpieces having the selected surface is made to be semitransparent; and
create the welding program including related data for the welding robot with regard to the set welding portion.

2. The program creation device according to claim 1, wherein the processor makes the workpiece having the selected surface in the product model to be semitransparent when the overlapping workpieces are detected.

3. The program creation device according to claim 2, wherein:
the processor recognizes surfaces of the overlapping workpieces detected to be in contact with the first one of the plurality of stacked sheet-like workpieces having the selected surface as common surfaces;

the processor designates a second one of the plurality of stacked sheet-like workpieces having a second surface selected from the common surfaces as a counter workpiece to be welded to the first one of the plurality of stacked sheet-like workpieces having the selected surface while the first one of the plurality of stacked sheet-like workpieces having the selected surface is made to be semitransparent; and the processor sets the welding portion to be allotted for the selected surface while the first one of the plurality of stacked sheet-like workpieces having the selected surface is made to be semitransparent, when the second one of the plurality of stacked sheet-like workpieces having the second surface is designated as the counter workpiece to be welded to the first one of the plurality of stacked sheet-like workpieces having the selected surface.

4. The program creation device according to claim 1, wherein:

the processor displays on the display, together with the product model, a setting region including a setting item for setting the welding portion while making the first one of the plurality of stacked sheet-like workpieces having the selected surface to be semitransparent; and the processor sets and allots the welding portion for the selected surface when a setting value is input to the setting item.

5. The program creation device according to claim 1, wherein the processor returns the first one of the plurality of stacked sheet-like workpieces having the selected surface to an initial state while displaying on the display the set welding portion on the selected surface.

6. The program creation device according to claim 1, wherein:

the welding robot includes a welding head for irradiating the plurality of stacked sheet-like workpieces with a laser beam; and the related data for the welding robot is data on a moving course of the welding head relative to the plurality of stacked sheet-like workpieces.

7. A welding system for performing spot welding on a plurality of stacked sheet-like workpieces so as to manufacture a product, the system comprising:

a welding robot configured to perform the spot welding on the plural workpieces;

the program creation device according to claim 1 for creating the welding program for performing the spot welding on the plural workpieces; and an NC device configured to control the welding robot in accordance with the welding program.

8. A program creation method of creating a welding program to control a welding robot for performing spot welding on a plurality of stacked sheet-like workpieces so as to manufacture a product, the method comprising;

generating image data of a product model and displaying the product model on a display;

determine whether there are any overlapping workpieces on a first one of the plurality of stacked sheet-like workpieces having a selected surface in the product model;

making the first one of the plurality of stacked sheet-like workpieces having the selected surface in the product model to be semitransparent;

setting a welding portion to be allotted for the selected surface in a state where the first one of the plurality of stacked sheet-like workpieces including the selected surface is made semi-transparent; and creating the welding program including related data for the welding robot with regard to the set welding portion.

* * * * *